United States Patent
Cassidy (10) Patent No.: US 12,459,290 B2
(45) Date of Patent: Nov. 4, 2025

(54) METHOD AND SYSTEM FOR CREATING PAINT COLOR EXAMPLES

(71) Applicant: Michael Drew Cassidy, Decatur, GA (US)

(72) Inventor: Michael Drew Cassidy, Decatur, GA (US)

(*) Notice: Subject to any disclaimer, the term of this patent is extended or adjusted under 35 U.S.C. 154(b) by 472 days.

(21) Appl. No.: 18/120,391

(22) Filed: Mar. 11, 2023

(65) Prior Publication Data

US 2024/0300260 A1 Sep. 12, 2024

(51) Int. Cl.
  *B44D 2/00* (2006.01)
  *B44D 3/00* (2006.01)
  *B44D 3/08* (2006.01)

(52) U.S. Cl.
  CPC .............. *B44D 2/002* (2013.01); *B44D 3/003* (2013.01); *B44D 3/08* (2013.01)

(58) Field of Classification Search
  CPC . B44D 2/00; B44D 2/002; B44D 3/00; B44D 3/002; B44D 3/003; B44D 3/04; B44D 3/06; B44D 3/08; B44D 3/22; G01J 3/46; G01J 3/463; G01J 3/467; G09B 11/10; G09B 19/0023
  USPC ........... 434/81–84, 98–104; 206/1.7, 1.8, 1.9
  See application file for complete search history.

(56) References Cited

U.S. PATENT DOCUMENTS

| | | | | |
|---|---|---|---|---|
| 3,628,260 A * | 12/1971 | Jacobson | ............... | G09B 11/10 434/103 |
| 7,563,098 B2 * | 7/2009 | Whitman | ............... | G09B 11/10 434/98 |
| 8,089,482 B1 * | 1/2012 | Axelrod | .................. | G01J 3/522 345/589 |
| 8,666,540 B2 * | 3/2014 | Milhorn | .................. | B01F 29/62 700/239 |
| 10,940,452 B2 * | 3/2021 | Velten | .................... | G06Q 20/20 |
| 11,865,502 B2 * | 1/2024 | Kinnen | .................. | G06Q 20/18 |
| 2004/0030510 A1 * | 2/2004 | Van Biemen | ........... | B01F 33/84 356/402 |
| 2004/0078299 A1 * | 4/2004 | Down-Logan | ......... | G06Q 30/02 705/26.1 |
| 2005/0135671 A1 * | 6/2005 | Levin | ...................... | G01J 3/522 382/162 |
| 2005/0208456 A1 * | 9/2005 | Swanick | ............ | G09B 19/0023 434/84 |
| 2007/0012378 A1 * | 1/2007 | Miller | ....................... | B05B 1/28 222/135 |

(Continued)

*Primary Examiner* — Milap Shah (57) ABSTRACT

A method and system for creating exemplary end-use paint color includes a network module providing a first user input including paint color characteristics from a user device of a user to a paint analysis module. At least one colorant identifier associated with the first user input is generated by the paint analysis module via a color formula database. Colorants associated with the colorant identifiers are supplied to a kit, which is provided to the user. A second user input including a paint quantity is provided to the conversion module from the user device. A conversion module generates a quantity of each of the colorants based on the second user input; the quantities are sent to the user device. User-preferred paint colors are formed via a mixing means and applied to a display means. One or more user-preferred paint colors are confirmed as exemplary end-use paint colors by the user.

20 Claims, 4 Drawing Sheets

(56) References Cited

U.S. PATENT DOCUMENTS

| | | | |
|---|---|---|---|
| 2008/0026347 A1* | 1/2008 | Whitman | G09B 11/10 |
| | | | 434/84 |
| 2008/0249716 A1* | 10/2008 | Huang | G06F 30/00 |
| | | | 702/30 |
| 2008/0305241 A1* | 12/2008 | Trevino, III | B01F 35/881 |
| | | | 700/239 |
| 2009/0112371 A1* | 4/2009 | Hughes | G05D 11/132 |
| | | | 700/282 |
| 2010/0040998 A1* | 2/2010 | Thurston | G09B 19/0023 |
| | | | 434/84 |
| 2012/0170840 A1* | 7/2012 | Caruso | G06F 3/048 |
| | | | 382/165 |
| 2016/0321546 A1* | 11/2016 | Delespierre | G01J 3/463 |
| 2018/0229194 A1* | 8/2018 | Blair, II | B01F 33/8442 |
| 2021/0122187 A1* | 4/2021 | Strada | B44D 3/003 |
| 2025/0017355 A1* | 1/2025 | Charraud | G01J 3/0264 |

\* cited by examiner

METHOD AND SYSTEM FOR CREATING PAINT COLOR EXAMPLES

FIELD OF THE INVENTION

The disclosure relates generally to paint sample formation, and more specifically to methods and systems for creating customized paint color examples.

BACKGROUND OF THE INVENTION

Traditional color samples are produced from low grade paint and, according to experts in the paint industry, should not be used as a finish coat. These samples are typically created from quantities ranging from as little as seven ounces (about 207.01 ml) up to a one-quart container. When creating and evaluating a color at home or at a paint store, a consumer will attempt to get the most accurate sense of how the color may look in their room or living space. Using existing paint sample boards, such as Samplize® (a registered trademark of Samplize LLC) peel & stick paint samples, appear to be affordable and advantageous, but in actuality forces a consumer to go to a paint store and have the peel & stick paint samples matched to their desired line of final paint product to be purchased. This fact is confirmed by the existence of one-star reviews of Samplize's® product, where consumers express that they want to see the product in different sheen levels and are unhappy when realizing that the samples are unable to match their desired/preferred final paint product. It is noted that the consumer can evaluate a particular paint color in all different areas of a room without the mess of a traditional paint sample, but a flaw exists within the final ordering process. The issue is the waste associated with the traditional color sampling methods and sample printed color chips; since the samples and chips do not present the final purchased paint color, a consumer cannot rely on the samples and chips to accurately depict what the paint will look like in their space (thus leading to multiple iterations of the samples and chips being made that result in unnecessary waste).

Another problem with current chip samples is that the printed sample chips are much too small in order to present how a color would look in a large-scale area or space. In addition, the use of electronic devices to scan a color to view on the display of the electronic device is inaccurate due to the electronic device attempting to match the captured color to the pixels within its screen. Using online apps and fancy digital displays in big box outlets is far removed from reality; these are illusions used by the paint industry that further overwhelm and confuse the average consumer. It is further noted that viewing colors side-by-side does not allow accurate representation of an actual paint color and its hue due to a scientific phenomenon known as "spontaneous contrast". Additionally, machines used to produce sample paint also add to paint sample inconvenience since the process involved in attempting to select a color of paint is often long, tedious, and generally frustrating.

Samplers are popular, but are not usually made from the actual final paint product used for a project. They are cheaper, low-grade versions of paints applied to walls or cards that allow a client an "attempt" to visualize their color choice. The problem here is that in most instances, when the client purchases their final paint product, it typically is not going to match their initial sample paint purchase or printed chip that they had viewed previously. Years ago, in order to create a paint sample, a consumer would take a small tube of colorant and add it to a gallon of paint; this was not always an accurate process. Using this old way of making a sample, a consumer could not produce paint color samples/examples smaller than a quart and would also not be able to alter the paint color accurately after a colorant was added.

Generally, consumers have found it difficult to pick paint colors, which has led to a waste of resources, time, and money. Color matching across multiple material types used to be a daunting task for suppliers and consumers, but the process has become more sophisticated, thanks to color tools and color apps that can match color within seconds from a wall to a printed chip. However, they do not allow a typical consumer access to the paint formula or store colorant.

The above means for viewing and ordering paint has generated multiple issues, a first being that a person is not supplied the finalized paint product during the sampling process, so the paint used to cover the consumer's walls/trim can be far from accurate when compared to the consumer's end-use paint product (due to the various bases and sheens that make up an end-use paint color product). The manufacturers' process is not only time wasting but hard to facilitate, when in today's environment time is more valuable than the cost of a color sampler.

Another problem that exists with prior methods of paint ordering is that color(s) on printed chips are placed next to each other on strips, books, brochures, or fluorescently lit chip walls located in fluorescently lit commercial stores; this lighting adds a bluish tinge to the chips when viewed by a consumer who is then not able to ascertain one color at a time. Putting two paint colors together on chip walls, strips, and/or books distorts both paint colors and impairs an accurate perception of a single color. This phenomenon, known as "spontaneous contrast", has been considered a scientific fact for hundreds of years. Typical interior design and color consultant schools only teach basic knowledge in this area to their students and never emphasize phenomenon so that graduates avoid educating their clients while in business.

Furthermore, experts in the paint industry with multiple decades of experience have observed that between 50 to 70 percent of observed paint samples made in a retail paint establishment are inaccurate. The inaccuracy is due to a lack of proper management of paint color formulas (employees not updating formulas, etc.). Additionally, many retail paint establishments use spectrometers that are outdated and/or have been improperly cleaned or taken care of.

The current architectural paint ordering system traps the typical consumer and essentially turns them into a victim of the paint industry's unnecessary, endless revolving door of illusion and deception. This statement is presented due to the fact that the architectural paint industry has been aware of its shortcomings for decades and only made them worse with the current technology being used. A need exists for an efficient, convenient, and quick means for creating environmentally friendly exemplary paint colors.

BRIEF SUMMARY OF THE INVENTION

The following summary is provided to facilitate an understanding of some of the innovative features unique to the present invention, this is not intended to be a full description. A full description of the various aspects of the invention can be gained by taking the entire specification, claims, and abstract as a whole.

The disclosed subject matter provides an embodiment of a method for creating at least one exemplary end-use paint color. The method may utilize a paint analysis module, a conversion module, a network module, a color formula database, and a user device. The method includes providing, by the network module, a first user input from the user device of a user to the paint analysis module. Once the user input is delivered to the paint analysis module, the paint analysis module generates at least one colorant identifier associated with the first user input that is stored in the color formula database. A kit is then supplied with at least one colorant associated with each of the at least one colorant identifier. The kit, which is configured to provide components for creating the at least one exemplary end-use paint color, is then provided to the user. A second user input is then provided from the user device to the conversion module via the network module. The conversion module then generates a quantity of each of the at least one colorant, where the quantity of each of the at least one colorant is based on the second user input. Once the quantities of each of the at least one colorant is generated, the quantities are sent to the user interface of the user device. The user may then form at least one user-preferred paint color that is based on the first and second user inputs, where each of the at least one user-preferred paint color is formed via a mixing means of the kit that is configured to combine a pre-reduced paint product and the at least one colorant. Each of the at least one user-preferred paint colors are then applied, by the user, to a display means of the kit; the display means is configured to display the at least one user-preferred paint color in an end-use state. Once user-preferred paint colors are applied to the display means, any of the user-preferred paint colors can be confirmed, by the user, as the at least one exemplary end-use paint color.

The disclosed subject matter further provides a kit that is configured to provide components for creating at least one exemplary end-use paint color. The kit includes a pre-reduced paint product that includes an untinted paint, at least one colorant, and a mixing means configured to mix a combination of the pre-reduced paint product and at least one colorant in order to form at least one user-preferred paint color having a unique color formula. The kit further includes a paint color system user interface configured to be presented on a user device, where the paint color system user interface, in conjunction with a computing device having a processor, a memory, a non-transitory computer-readable storage device, and program instructions, is further configured to perform one or more functions. Paint color system user interface is configured to receive user input including at least one user-preferred paint color identifier. Each of the at least one user-preferred paint color identifiers are associated with a respective one of the at least one user-preferred paint color and a user-preferred paint quantity associated with each of the at least one user-preferred paint color. Paint color system user interface is further configured to provide, via the user interface, quantities of at least one colorant, based on the user input, to the user device.

The disclosed subject matter further provides a computing system. The system includes at least one processor, a network module coupled to the at least one processor to enable communication over a network, and a color formula database. The color formula database comprises a plurality of paint color identifiers each associated with at least one base color identifier. System also includes a conversion module and a paint analysis module each connected to the color formula database. System further includes a memory operatively coupled to the at least one processor, the conversion module, and the color formula module; the memory is configured to store computer readable instructions executable by the processor via the memory. System, in conjunction with the program instructions, is capable of performing at least a portion of a method for creating at least one exemplary end-use paint color. The network module provides a first user input from a user device to a paint analysis module. Once the first user input is provided to the paint analysis module, the paint analysis module generates at least one colorant identifier, each associated with a colorant, in response to the first user input. The network module then provides, a second user input from the user device to the conversion module. Once the second user input is provided to the conversion module, the conversion module generates a quantity of each of the at least one colorant associated with the second user input. The network module then sends the quantity of each of the at least one colorant to the user interface of the user device. Each of the at least one colorant is provided to the user in a kit so that the user can form the at least one exemplary end-use paint color based on the first and second user inputs.

BRIEF DESCRIPTION OF THE DRAWINGS

The disclosed subject matter, objectives, and advantages thereof, will best be understood by reference to the following detailed description of an illustrative embodiment when read in conjunction with the accompanying drawings, wherein.

DETAILED DESCRIPTION

Reference now should be made to the drawings, in which the same reference numbers are used throughout the different figures to designate the same components.

It will be understood that, although the terms first, second, third, etc. may be used herein to describe various elements, these elements should not be limited by these terms. These terms are only used to distinguish one element from another element. Thus, a first element discussed below could be termed a second element without departing from the teachings of the present disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Figure 1:
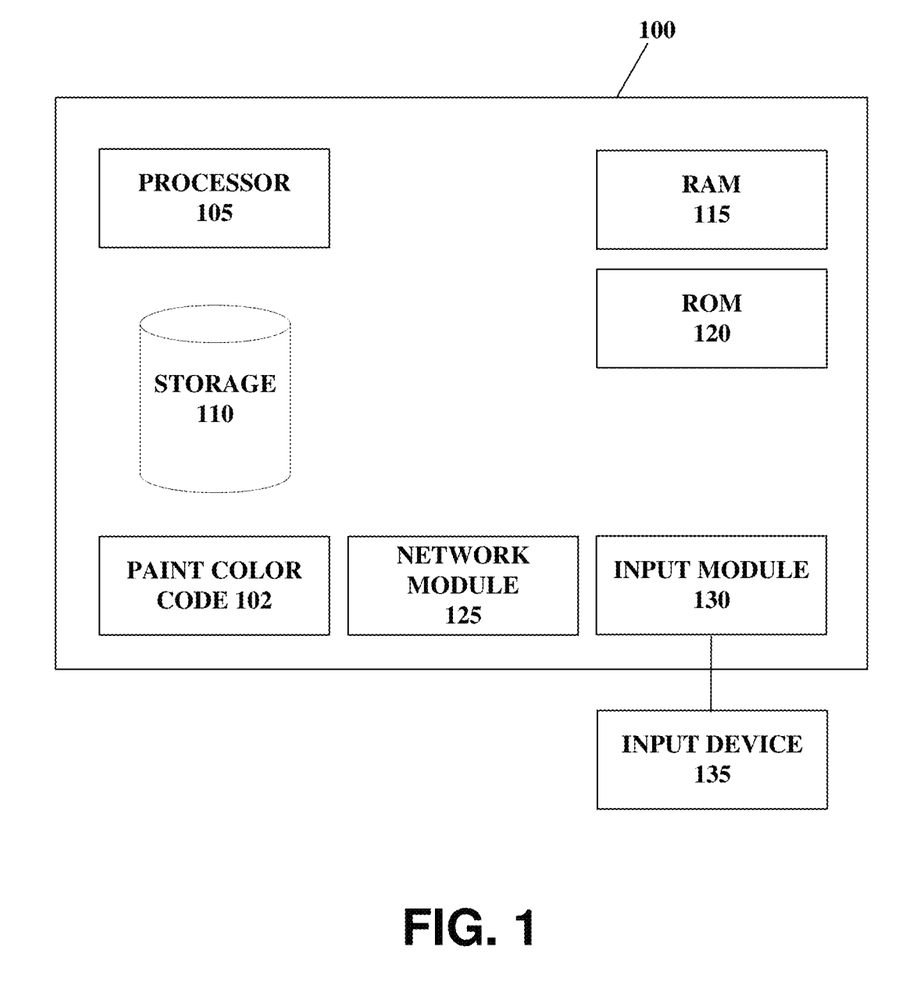
FIG. 1 illustrates a functional block diagram of a computing environment that can communicate with various networked components.

FIG. 1 illustrates a functional block diagram of a computing environment 100 that can communicate with various networked components. In particular, computing environment 100 may be used to implement a module, such as, but not limited to, a paint analysis module 245 and a conversion module 250.

Computing environment 100 includes an example of an environment for the execution of at least some of the computer code involved in performing the disclosed methods, such as paint color code 102. Computing environment 100 may also include a plurality of components for processing, storing, inputting, and outputting data. As an example, processor 105 may carry out tasks including, but not limited to, retrieving data from a storage device such as storage 110 and executing one or more applications/modules. Additionally, storage 110 may be configured to store data long term that may include data files, modules, and/or applications as disclosed. Storage 110 may include computer readable media such as, but not limited to flash memory, magnetic tape storage systems, disc drives, and optical storage media.

Computing environment 100 may include one or more communication components for transmitting and receiving data over a network. Types of networks include, but are not limited to, digital broadcast networks, cellular networks, and Internet Protocol (IP) networks. Computing environment 100 may include modules suited to communicate through one or more of these networks. Specifically, computing environment 100 may include network module 125 for communication with one or more other computer or computing devices over an IP network. As an example, network module 125 may facilitate transmission or receipt of information from a worldwide network such as the Internet. In one or more arrangements, network module 125 may provide wireless network access for computing environment 100. As another example, network module 125 may facilitate transmission of data such as transaction data, electronic mail messages, and other information over a company or organization's network.

Instructions and/or application data may be temporarily stored in Random Access Memory (RAM) module 115, which is connected to processor 105. RAM module 210 may be accessed and stored in any order, providing equal accessibility to the storage locations in RAM module 115. Read Only memory (ROM) 120 allows stored data to survive or persist after computing environment has been shut off. ROM may be utilized for a number of purposes including, but not limited to, storage of computing environment's 100 BIOS. ROM may additionally store time and date information so that the information persists even through reboots and shut downs.

As illustrated, computing environment 100 may accept and/or receive input from one or more input devices 135. Input devices 135 may be associated with an input module 130 for converting the input into computer recognizable/readable data. As an example, voice input received through a microphone (not depicted) may be converted into a digital format and stored in a data file.

It is noted that computing environment 100 may include a variety of other components and is not limited to the devices and systems described in FIG. 1. For example, computing environment 100 may further include one or more output adapters configured to translate processor instructions into corresponding output such as, but not limited to video and audio signals (conveyed through one or more displays and one or more audio output devices such as a speaker).

The present disclosure generally relates to systems and methods for creating exemplary end-use paint colors. By virtue of the subject matter discussed herein, paint analysis and characteristic correlation is combined with quantity reduction analysis to construct a pipeline to achieve accurate and small quantity samples of exemplary paint colors for analysis by a user. These samples may not only reduce the hassle of providing the ability for a paint customer to create samples of exemplary end-use paint colors at their own house/establishment, but may also reduce paint waste by providing small exemplary paint color samples that provide just enough paint for a customer to analyze/view within a preferred environment.

Importantly, although the functional and/or operational descriptions herein may be understandable by the human mind, they are not abstract ideas of the functions and/or operations divorced from computational implementation of those functions and/or operations. Instead, the functions and/or operations serve as a specification for an appropriately configured computing system/device. As presented below, the functional and/or operational language is to be read in its proper technological context, that is, as concrete specifications for physical implementations.

As a result, one or more of the methodologies presented may obviate a need for time consuming processing of data by the user. This may have the effect of reducing computing resources used by one or more devices within the system. Computing resource examples may include, but are not limited to, storage space, power consumption, memory usage, processor cycles, and network traffic.

It should be appreciated that details of the teachings disclosed are beyond the capability of a human mind. Further appreciation should be given to the fact that embodiments may include information that is impossible to obtain manually by an entity (such as, for example, a human user). As an example, the amount, variety, and/or type of information included in performing disclosed processes may be more involved than information that could reasonably be processed manually by a human user.

Figure 2:
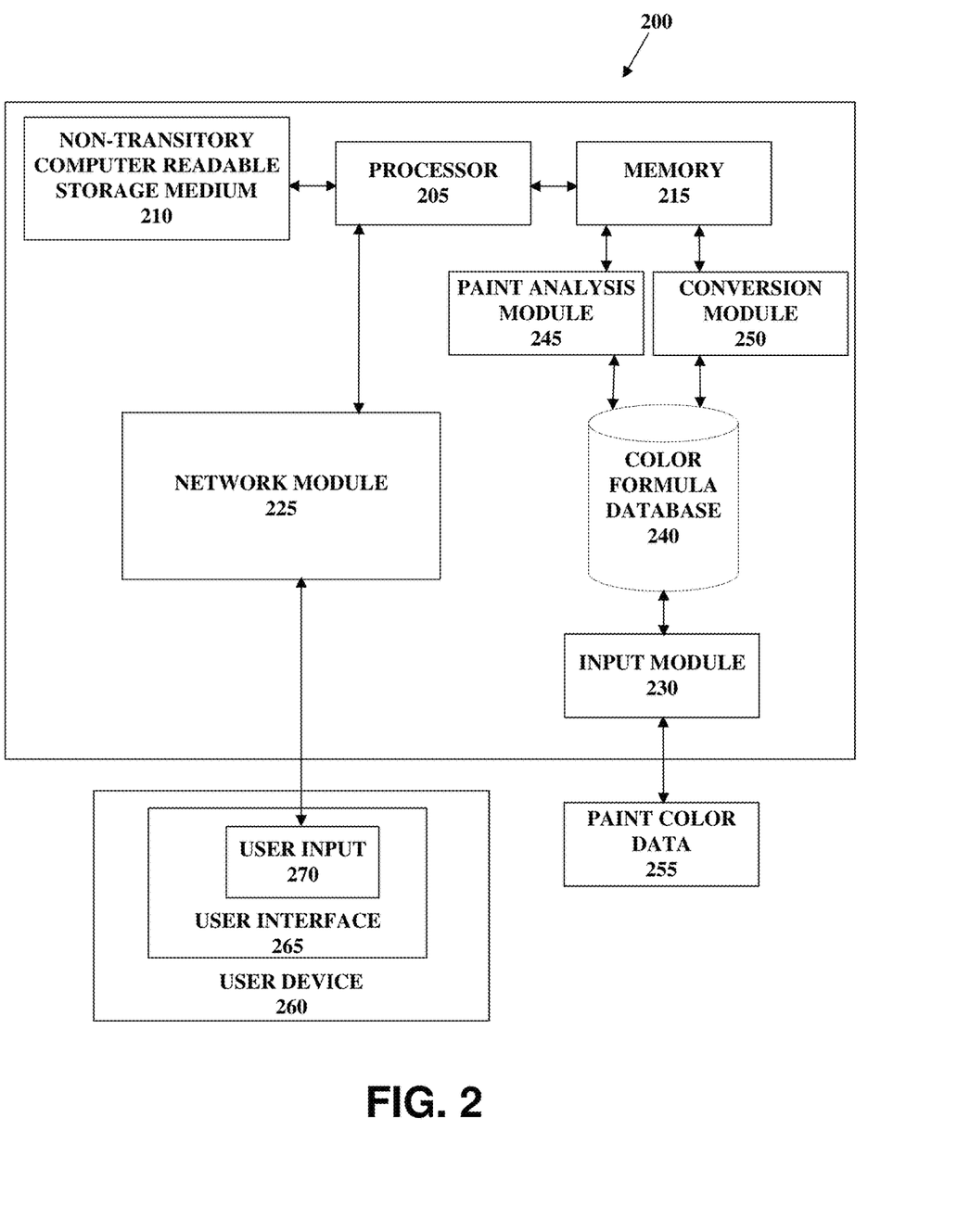
FIG. 2 displays a system for creating at least one exemplary end-use paint color, consistent with an illustrative embodiment.

FIG. 2 displays a system 200 for creating at least one end-use paint color, consistent with an illustrative embodiment. As shown, network module 225 (similar to network module 115 of FIG. 1) provides a connection between modules 245, 250 and a user device 260 capable of receiving user input 270. User device 260 provides data relating to paint color characteristics and quantities that assists a paint analysis module 245 and a conversion module 250 to form a dataset based on user-preferred paint color identifiers/information and user-preferred paint quantities (also referred to as first user input and second user input). Network module 225 is connected to processor 205 to provide processor 205 communication over a network established by network module 225. In addition, processor 205 is coupled to a non-transitory computer-readable storage device 210.

Program instructions (also referred to as paint color code 102) stored on the non-transitory computer-readable storage device are configured for execution by the processor 205 via a memory 215 (similar to the RAM 115 of FIG. 1) coupled to processor 205. The instructions are configured to render system 200 capable of performing a number of operations in a method for creating exemplary end-use paint colors (also presented in FIG. 4). The method includes providing, by the network module 205 a first user input from a user device 260 to the paint analysis module 245. First user input 270 may include, but is not limited to, at least one user-preferred paint color identifier. The at least one user-preferred paint color identifier may correspond to at least one color of paint that an individual (or user) has identified as a possible preference to be utilized in an environment of the individual. For example, an individual may want to paint a room of their house; the user may have identified multiple preferences of paint colors that the user may want to use to paint the room. It is noted that each of the at least one user-preferred paint color identifiers may include specific characteristics of paint colors and may include, but is not limited to a paint color name, a paint color formula, and a color measurement.

After the first user input 270 is delivered to the paint analysis module 245, paint analysis module 245 may generate at least one colorant identifier in response to the first user input 270. Each of the at least one colorant identifier may be associated with at least one colorant and may also be stored as a dataset in color formula database 240,340; one or more colorants may be utilized to create a user-preferred paint color. In embodiments, a colorant identifier may comprise a colorant name. Based on the user input 270, 370, paint analysis module 245 may execute program instructions to correlate the user input 270,370 to at least one colorant identifier in the colorant dataset. The at least one colorant identifiers may then be provided to user interface 265,365 of user device 260,360, where a user is able to identify colorants from the colorant identifiers that relate to the paint color information of user input 270,370. These provided identifiers may also/alternately be provided to an additional user interface of system 200, where the colorant identifiers may be acknowledged by an individual so that the individual may provide colorants in containers (correlated to the colorant identifiers) to a kit (such as, but not limited to, kit 300).

Network module 205 may then provide a second user input 270 from the user device 260 to the conversion module 250. Second user input 270 may include, but is not limited to, at least one user-preferred paint quantity. It is noted that the user-preferred paint quantity may be of a quantity that is enough of an amount of paint to be utilized on one or more sample displays, chips, etc. and not necessarily enough to paint large sections of an environment; in embodiments, the user-preferred paint quantity may be a number of ounces or less. In further embodiments, the user-preferred paint quantity may range from between 0.25 ounces and 6 ounces.

Conversion module 250 may then generate a quantity of each of the at least one colorant, where the quantity of each of the at least one colorant is associated with the second user input 270/user-preferred paint quantity. The quantities of each of the at least one colorant may then be sent to the user interface 265 of the user device 260 via the network module 225. It is noted that each of the identified colorants may be provided to the user in a kit (such as kit 300 found in FIG. 3) so that the user can form each of the user-preferred paint colors (and subsequently, at least one exemplary end-use paint color.

For the purposes of this disclosure, the first user input and the second user input may both be referred to as element 270 and or element 370.

Figure 3:
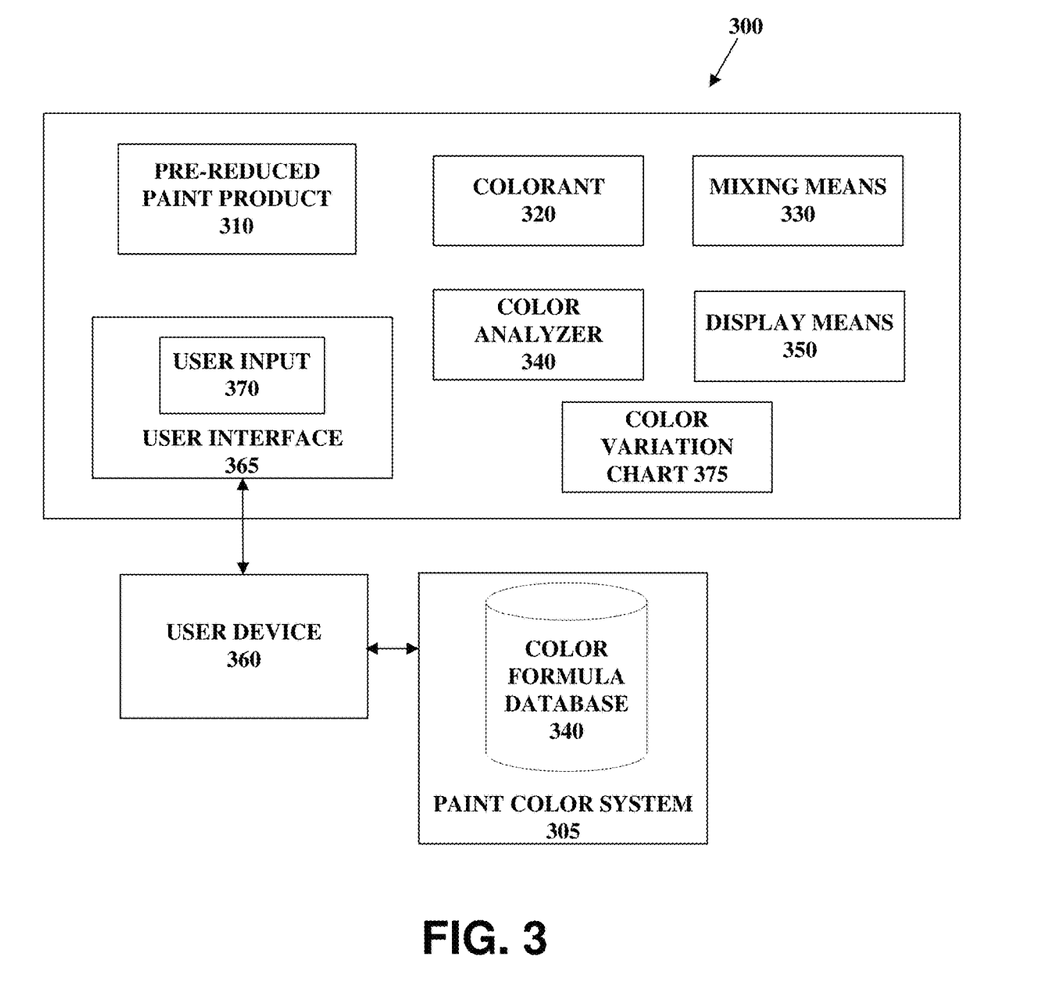
FIG. 3 displays a kit for creating at least one exemplary end-use paint color, consistent with an illustrative embodiment.

FIG. 3 displays a kit 300 for creating at least one exemplary end-use paint color, consistent with an illustrative embodiment. Kit 300 may provide, to a user (customer) items/components configured to assist a user in creating one or more exemplary end-use paint colors from an establishment of the user's choice (such as, but not limited to, the user's residence). Kit 300 may include a quantity of a pre-reduced paint product 310 as well as one or more colorants 320 that when combined, may create one or more user-preferred paint colors (such as those previously mentioned). In order to combine the pre-reduced paint product 310 and the colorants 320, a mixing means 330 may be included in kit 300 that may be configured to mix a combination of the pre-reduced paint product 310 and the colorants 320 in order to form at least one user-preferred paint color each having a unique color formula. Once the user-preferred paint colors are formed, each of the colors may be applied, by the user, to a display means 350 configured to display each of the user-preferred paint colors in an end-use state. Display means 350 may provide to the user a means of visualizing the user created user-preferred paint colors so that the user may judge and confirm any of the user created user-preferred paint colors as exemplary end-use paint colors. Display means 350 may include, but is not limited to, chips and drawdown cards; display means 350 may be configured to be presented at a user's preferred end-use environment of the paint so that the user may accurately analyze each of the paint colors.

Kit 300 may further include a paint color system user interface 365 configured to be presented on a user device 360. User interface 365 may be further configured to receive user input 370 that may include, but is not limited to a user-preferred paint color identifier associated with each of the at least one user-preferred paint color and a user-preferred paint quantity also associated with each of the at least one user-preferred paint color. User interface 365 may communicate these identifiers and quantities to a paint color system 305 (similar to system 200 found in FIG. 2) having a color formula database 340 to correlate the identifiers to actual paint colors. Based on the quantities input, user interface 365 may further provide, via paint color system 305 and color formula database 340, quantities of at least one colorant to user device 360. At this point, a user of user device 360 may utilize the quantities of the at least one colorant to create user-preferred paint colors.

Kit 300 may include components configured to provide the user a capability to perform a number of actions related to the creation of at least one user-preferred paint color. User may form at least one user-preferred paint color based on the user input 370, where each of the at least one user-preferred paint color may be formed via the mixing means 330 (mixing a quantity of pre-reduced paint product 310 with a quantity of at least one colorant 320 one or more times to form each of the user-preferred paint colors). User may then apply each of the user-preferred paint colors to display means 350 so that the user may accurately analyze each of the user-preferred paint colors in an end-use state. The user may then confirm any of the user-preferred paint colors as exemplary end-use paint colors (based on the analysis of the user). In embodiments, the pre-reduced paint product 310 may be reduced from between 2% and 10% with water; the reduction may be performed so that the paint product 310 can mix properly with the at least one colorant in the mixing means 330. In other embodiments, the pre-reduced paint product 310 may not be pre-reduced. In further embodiments, the pre-reduced paint product 310 and the at least one colorant may be agitated in the mixing means 330 from between 30 seconds and 2 minutes.

It is noted that system 200, in conjunction with kit 300, may provide a user the ability to create at least one "desired" or "preferred" exemplary paint color from architectural paint that can be utilized with any residential or commercial paint project. The exemplary paint colors (exemplary end-use paint colors) may be made as exemplary "micro" paint color samples due to the fact that the final amounts of the samples may be much smaller than a typical paint sample ordered from a retail paint store. The ability to create the exemplary paint colors may not only increase the accuracy of the paint sample creation process, but may also reduce the amount of waste relative to a typical process of making paint samples. In embodiments, system 200 and kit 300 may enable a user to produce an exemplary end-use paint color as small as 0.25 ounces and up to 20 ounces. Instead of creating an amount of sample paint that may never fully get used (paint cans from retail establishments that are typically 8 ounces or more) or that may not get used due to the paint being the correct color, a user can create accurate exemplary paint color samples that are of a volume that may cover as little as a single paint card (per paint example) so that there is little to no wasted paint product.

In embodiments, kit 300 may comprise a color analyzer 340. Color analyzer 340 may comprise any type of device capable of analyzing characteristics of colors and may include, but is not limited to, a colorimeter and a spectrophotometer.

In embodiments, kit 300 may include a color variation chart 375 that may present visual representations of variations of one or more colors. The varied colors may include differences in color characteristics. In a specific embodiment, color variation chart 375 may display a single paint color and one or more paint color derivatives varying in hue (when compared to the single paint color). It is noted that the single paint color may be a user-preferred paint color; in this case, color variation chart 375 may be a useful tool to present alternative paint colors to a user (for them to create samples from, compare, etc.). In further embodiments, the paint color derivatives may embody a variance in color, from the single paint color or from each other, in specific increments. For example, these increments may be a certain number of drops (or less than a drop) added to either of the single paint color and each of the other paint color on the color variation chart 375. In further embodiments, the single paint color and each of the other paint colors may vary in at least one of tint and shade.

In embodiments, color formula database 340 may be configured to store information relating to paint colors. The information may include, but is not limited to, a paint color name, a paint color formula, and a color measurement. A paint color name may or may not be related to a company brand-name paint. An associated paint color formula may be at least one of an established paint color formula related to a company's paint color formula and a modified paint color formula relating to nonstandard measurements used in the paint industry. Color measurements may include information relating to the color of the paint such as, but not limited to, Hex color codes, CIELAB values, RGB values, LCH values/aspects, LRVs, CMYK values, and Delta E values.

In embodiments, exemplary paint color samples may be produced that comprise a volume as small as 0.25 ounces of paint. This amount may be utilized to create a display means 350 as small as a 4-inch color card sample and, on the larger end, a 32 inch×20 inch color board (depending on the preference of the user). In other embodiments, display means 350 may include, but is not limited to, an 8 inch×8 inch cards/boards and 15 inch×20 inch cards/boards. Cards/boards may comprise, in embodiments, plastic (such as, but not limited to, PVC), wood, and paper. Cards/boards, in embodiments, may include a hole drilled into the center of the boards so that the paint on the cards/boards may be more easily compared to a paint already existing on a wall/surface. In other embodiments, a single card/board may include velcro that may be utilized to attach smaller cards/boards to the single card/board so that paint colors on the smaller cards/boards may be easily viewed and compared to one another (and/or compared to one or more paint colors on the single card/board).

In embodiments, user-preferred paint quantities may range from 0.25 ounces to 6 ounces. These amounts of paints may allow a user to create small samples of paint that may allow a user to reduce/minimize waste related to paint creation. As an example, a user may create 0.25 ounces of a paint that may provide enough paint for a 4 inch square of a display means 350. As another example, a user may create 0.5 ounces of a paint that may provide enough paint for an 8 inch square of a display means 350. As another example, a user may create 1 ounce of a paint that may provide enough paint for an 16 inch square of a display means 350. As another example, a user may create 2 ounces of a paint that may provide enough paint for an 15 inch×20 inch rectangle of a display means 350. In further embodiments, user-preferred paint quantities may range from 0.25 ounces to 4 ounces. In further embodiments, user-preferred paint quantities may range from 0.25 ounces to 2 ounces. In further embodiments, user-preferred paint quantities may range from 0.25 ounces to 1 ounce. In further embodiments, user-preferred paint quantities may range from 0.25 ounces to 0.5 ounces. In further embodiments, user-preferred paint quantities may range from 0.25 ounces to 0.25 ounces.

In embodiments, colorants may be measured using any of a pipette, a syringe, or any other device that is capable of measuring or quantifying colorant 320 on a scale of milliliters and/or microliters so that an individual can create a small-scale paint sample that is environmentally friendly and does not use excessive materials. In embodiments, pipettes may comprise a volume ranging from 50 microliters to 1,000 microliters and syringes may comprise a volume ranging from 1 milliliter to 150 milliliters. In certain embodiments, the containers may allow an individual to utilize an individual to create as little as 0.02% of a drop of colorant. In other embodiments, a user may utilize colorant containers that may allow an individual to create paint at a volume of 0.25% of a standard gallon of paint. It is noted that supplies provided in kit 300 may allow an individual to create paint samples much smaller than what a typical retail paint store can provide to a consumer. In embodiments, colorants may be stored in plastic or glass containers. In other embodiments, the containers may comprise at least one of a squeezable container and a container with graduated measurements. In further embodiments, containers may comprise a volume ranging from ½ an ounce to 4 ounces. In further embodiments, containers may comprise a volume greater than 4 ounces.

In embodiments, kit 300 may comprise up to 12 colorants that may be utilized to create exemplary paint colors. In further embodiments, kit 300 may comprise not more than 4 colorants.

Figure 4:
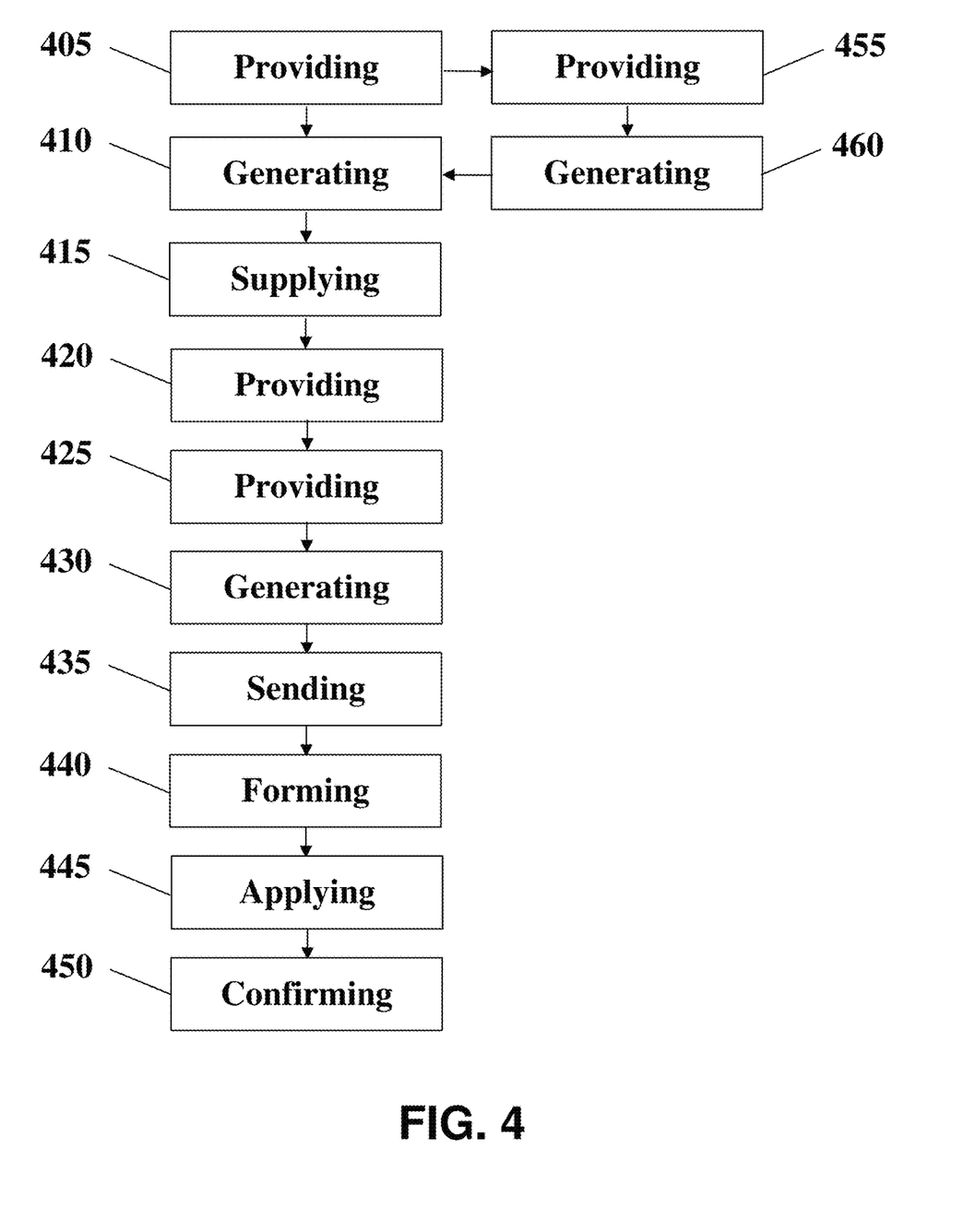
FIG. 4 illustrates a flowchart for a method for creating at least one exemplary end-use paint color, consistent with an illustrative embodiment.

FIG. 4 illustrates a flowchart for a method 400 for creating at least one exemplary end-use paint color, consistent with an illustrative embodiment. The flowchart is representative of a sequence of operations that can be implemented in software, hardware, or a combination thereof. With reference to software and computers, the computer-executable instructions executable by one or more processors represents operations relating to method 400. Generally, computer-executable instructions may include data structures, components, programs, routines, objects, and the like that implement abstract data types and/or perform functions. For exemplary purposes, method 400 is described in relation to a kit 300, a paint analysis module 245, a conversion module 250, a network module 225, a color formula database 240, and a user device 260,360 of FIGS. 2 and 3. It is further noted that the order of operations/steps of method 400 presented above are exemplary, and any amount of the described steps/processes may be combined in any order and/or performed in parallel to carry out method 400.

Method 400 may include providing 405, by the network module 225, a first user input (similar to user input 270,370)

from the user device 260,360 of a user to the paint analysis module 245. First user input 270,370 may include at least one user-preferred paint color identifier, which can each include one or more characteristics of a paint color identified as preferable by a user. In the case where the paint color is not identifiable with a label, a color analyzer (similar to color analyzer 340 of FIG. 3) may analyze characteristics of colors and output the characteristics to an output device (such as, but not limited to, a display) so that a user may view the characteristics.

In embodiments, a user-preferred paint color identifier may include at least one piece of identifying information relating to a paint color. The identifying information may include information such as, but not limited to, a paint color name, a paint color formula, and a color measurement. A paint color name may or may not be related to a company brand-name paint. An associated paint color formula may be at least one of an established paint color formula related to a company's paint color formula and a modified paint color formula relating to nonstandard measurements used in the paint industry. Color measurements may include information relating to the color of the paint such as, but not limited to, Hex color codes, CIELAB values, RGB values, LCH values/aspects, LRVs, CMYK values, and Delta E values.

Once the first user input 270,370 is delivered to the paint analysis module 245, the paint analysis module 245 generates 410 at least one colorant identifier associated with the first user input 270,370 that is viewable by the user via the user interface 265,365 of user device 260,360; the at least one colorant identifier is stored in the color formula database 240. Each of the colorant identifiers may be representative of an actual colorant 320 that may be utilized by a user/customer in order to create one or more paint samples. At step 415, a kit 300 is supplied with at least one colorant 320 associated with each of the at least one colorant identifier. In embodiments, the colorants 320 may be supplied 415 within separate containers. The containers may, in embodiments, be any of a pipette, a syringe, or any other device that is capable of measuring or quantifying colorant 320 on a scale of milliliters and/or microliters so that an individual can create a small-scale paint sample that is environmentally friendly and does not use excessive materials. In embodiments, pipettes may comprise a volume ranging from 50 microliters to 1,000 microliters and syringes may comprise a volume ranging from 1 milliliter to 150 milliliters.

In embodiments, first user input 270,370 may include a user-owned paint color identifier, which can include one or more characteristics of a paint color owned by a user. In this embodiment, the owned paint color is not necessarily "preferred" by the user but the user may want to utilize a similar paint color. Hence a next step, prior to the generation 410 of the at least one colorant identifier, includes generating 455, by the paint analysis module 245, at least one tangential paint color identifier associated with the first user input 270,370 that is viewable by the user via the user interface 265,365 of user device 260,360; the at least one tangential paint color identifier is stored in the color formula database 240. An additional user input (similar to user input 270,370) may then be provided 460, by network module 225, from user device 260,360 of a user to the paint analysis module 245. Additional user input 270,370 may include at least one user-preferred tangential paint color identifier, which can each include one or more characteristics of a tangential paint color identified as preferable by a user. Additionally in this embodiment, once the additional user input 270,370 is delivered to the paint analysis module 245, the paint analysis module 245 may generate 410 at least one colorant identifier that may correlate with at least one color that needs to be added to/mixed with each paint color identifier so that the mixture may match each of the correlating tangential paint color identifiers.

Once the first user input 270,370 is delivered to the paint analysis module 245, the paint analysis module 245 generates 410 at least one colorant identifier associated with the first user input 270,370 that is viewable by the user via the user interface 265,365 of user device 260,360; the at least one colorant identifier is stored in the color formula database 240.

In embodiments, based on the color characteristics of a paint color, paint analysis module 245 may be configured to correlate the user-owned paint color identifier with at least one tangential paint color identifier, where each of the at least one tangential paint color identifier (representing a paint similar to the user-owned paint color of the user-owned paint color identifier) includes at least one altered color characteristic when compared to the color characteristics of the user-owned paint color identifier. In further embodiments, at least one of the tangential paint color identifiers may include a single altered color characteristic when compared to the color characteristics of the user-owned paint color identifier. In further embodiments, at least one of the tangential paint color identifiers may include more than one altered color characteristic when compared to the color characteristics of the user-owned paint color identifier. In the case where the tangential paint color identifiers include more than one altered color characteristic, the tangential paint color identifiers may be identified as being visually related in some way when viewed by an individual.

In a further embodiment, the paint color may be a user-preferred paint color, as opposed to a user-owned paint color.

Kit 300, which is configured to provide components for creating the at least one exemplary end-use paint color, is then provided 420 to the user. At step 425, second user input (similar to user input 270,370) is then provided from the user device 260,360 to the conversion module 250 via the network module 225. Second user input 270,370, in embodiments, may include user-preferred paint quantities that are quantities representative of amounts of paint that a user prefers to create with kit 300. The amounts may correlate with, for amounts of paint that may fit on an appropriate display means 350 for a user's end-use environment. For example, user-preferred paint quantities may correlate with an amount of a sample of paint that may cover a display means 350 such as, but not limited to, a paint chip and a drawdown card.

Conversion module 250 then generates 430 a quantity of each of the at least one colorant 320, where the quantity of each of the at least one colorant 320 is based on the second user input 270,370 (user-preferred paint quantities). Once the quantities of each of the at least one colorant 320 are generated 430, the quantities are sent 435 to the user interface 265,365 of user device 270,370. The user may then form 440 at least one user-preferred paint color that is based on the first and second user inputs 260,360, where each of the at least one user-preferred paint color is formed 440 via a mixing means 330 of the kit 300 that is configured to combine a pre-reduced paint product 310 and the at least one colorant 320. Mixing means 330 may include a device that may provide a shearing force to the combination of the combination/mixture of pre-reduced paint product 310 and the at least one colorant 320 so that the output of the device is a properly mixed paint product (or a user-preferred paint product). Devices may include, but are not limited to, a vortex mixer and a drill having a container configured to be attached to the chuck (or a bit) of the drill. It is noted that in certain embodiments, kit 300 may include container (and associated attachment bit) while a user may provide a drill, while in other embodiments, kit 300 may include both container (and associated attachment bit) and a drill.

Each of the at least one user-preferred paint colors are then applied 445, by the user, to a display means 350 of kit 300; the display means 350 is configured to display the at least one user-preferred paint color in an end-use state. As presented previously, display means 350 may include, but is not limited to, a paint chip and a drawdown card. For the purposes of this disclosure, the term "end-use state" may refer to a user-preferred paint color presented on a display means 350 to a user in an end-use environment (such as, but not limited to, a user's home); this may allow the user to effectively judge the user-preferred paint color.

Once user-preferred paint colors are applied 445 to the display means 330, any of the user-preferred paint colors can be confirmed 450, by the user, as the at least one exemplary end-use paint color. The confirming 450 may be based on the judgement of the user relating to how a user-preferred paint color "looks" in relation to being applied to the display means 350 and viewed in an end-use environment. As an example, a user may create three user-preferred paint colors that are similar in their formulas (similar color), but may look different when provided in an end-use environment. Based on how the user-preferred paint colors look when viewed in an end-use environment (by analysis of the user), user may identify one or more of the user-preferred paint colors as exemplary end-use paint colors that can be applied to the end-use environment. It is noted that application of system 200, kit 300, and method 400 may assist in eliminating the need for a user to visit a retail paint establishment since the user may be enabled to create an exemplary end-use paint color in any setting of the user's choice (such as their home, for example). In addition, exemplary paint colors may be created much more quickly than having paint made at a retail paint establishment.

In embodiments, a user may receive a kit 300 with a predetermined number of colorants 320 are provided to the kit 300. In this case, a user may not know and/or may not provide a preference of a paint color. Furthermore, method 400 may be carried out without the steps of providing 405, generating 410, and supplying 415.

For the purposes of this disclosure, the terms "user", "individual", and "customer" may be synonymous.

In embodiments, a user may include at least one of a customer/homeowner (making exemplary paint colors for their own property), a vendor (making exemplary paint colors for individuals/customers), a contractor, a designer, and a decorator. It is noted that kits 300 may be at least one of purchased and licensed by any of the aforementioned users.

In embodiments, any user interfaces disclosed (user interface 265,365 additional user interface of system 200) may be associated with an application program that may be run on any type of electronic computing device including, but not limited to desktop computers, laptops, tablets, smart TVs, and smartphones.

With reference to the disclosed embodiments, the computing devices, computer program products, methods, and kits provides an effective methodology and system to achieve quick, efficient, and eco-friendly exemplary paint colors from a customer's home.

A plurality of additional features and feature refinements are applicable to specific embodiments. These additional features and feature refinements may be used individually or in any combination. It is noted that each of the following features discussed may be, but are not necessary to be, used with any other feature or combination of features of any of the embodiments presented herein.

Unless otherwise defined, all technical and scientific terms used herein have the same meanings as are commonly understood by one of ordinary skill in the art to which this disclosure belongs. Although methods similar or equivalent to those described herein can be used in the practice or testing of the present disclosure, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present disclosure is not limited to what has been particularly shown and described hereinabove. Rather, the scope of the present disclosure is defined by the appended claims and includes both combinations and sub-combinations of the various features described hereinabove as well as variations and modifications thereof, which would occur to persons skilled in the art upon reading the foregoing description.

I claim:

1. A method for creating at least one exemplary end-use paint color using a paint analysis module, a conversion module, a network module enabling communications over a network, a color formula database, and a user device, the method comprising:
   providing, via the network module, a first user input from a user received on a user interface displayed by the user device to the paint analysis module;
   generating, by the paint analysis module, one or more colorant identifiers associated with the first user input, wherein the one or more colorant identifiers are stored in and retrieved from the color formula database;
   supplying, to a kit, a respective colorant associated with each of the at least one colorant identifiers;
   providing, to the user, the kit, wherein the kit configured to provide components for creating the at least one exemplary end-use paint color;
   providing, via the network module, a second user input from the user received on the user interface displayed by the user device to the conversion module;
   generating, by the conversion module, a quantity of each of the respective colorants, wherein the quantity of each of the respective colorants is based on the second user input;
   sending, via the network module, the quantity of each of the respective colorants to the user interface of the user device;
   forming, by the user, at least one user-preferred paint color based on the first user input and the second user input, wherein each of the at least one user-preferred paint color is formed via a mixing means of the kit configured to physically combine a pre-reduced paint product and each of the respective colorants;
   applying, by the user, the at least one user-preferred paint color to a display means of the kit, wherein the display means is configured to display the at least one user-preferred paint color in an end-use state; and
   confirming, by the user, the at least one user-preferred paint color in the end-use state as the at least one exemplary end-use paint color.

2. The method of claim 1, wherein the first user input comprises at least one user-preferred paint color identifier and the second user input comprises at least one user-preferred paint quantity.

3. The method of claim 2, wherein the user-preferred paint color identifier comprises at least one of a paint color name, a paint color formula, and a color measurement.

4. The method of claim 2, wherein the user-preferred paint quantity comprises a quantity of paint from 0.25 ounces to 6 ounces.

5. The method of claim 1, wherein the display means is non-electronic.

6. The method of claim 1, wherein the first user input comprises at least one user-owned paint color identifier.

7. The method of claim 6, further comprising generating, by the paint analysis module, at least one tangential paint color identifier associated with the first user input, wherein each of the at least one tangential paint color identifier include one or more characteristics of a tangential paint color identified as preferable by the user.

8. A kit comprising:
 a pre-reduced paint product, wherein the pre-reduced paint product includes an untinted paint;
 at least one colorant;
 a mixing means configured to mix a combination of the pre-reduced paint product and at least one colorant in order to form at least one user-preferred paint color having a unique color formula; and
 a paint color system user interface configured to be presented on a user device, wherein the user device includes a processor, a memory, and a non-transitory computer-readable storage device storing program instructions, which when executed by the processor, cause the processor to:
 receive, on the paint color system user interface, user input that includes at least one user-preferred paint color identifier, wherein each of the at least one user-preferred paint color identifier is associated with a respective one of the at least one user-preferred paint color and a user-preferred paint quantity associated with each of the at least one user-preferred paint color; and
 provide, via the paint color system user interface, data representing quantities of at least one colorant, based on the user input, to the user device, wherein the data is retrieved from a color formula database in network communication with the user device.

9. The kit of claim 8, wherein the kit comprise components configured to provide the user a capability to:
 form, by the user, the at least one user-preferred paint color based on the user input, wherein each of the at least one user-preferred paint color is formed via the mixing means;
 apply, by the user, the at least one user-preferred paint color to a display means of the kit, wherein the display means is configured to display the at least one user-preferred paint color in an end-use state; and
 confirm, by the user, the at least one user-preferred paint color in the end-use state as the at least one exemplary end-use paint color.

10. The kit of claim 8, wherein the user input comprises a first user input including the at least one user-preferred paint color identifier and a second user input including a user-preferred paint quantity.

11. The kit of claim 8, wherein the color formula database comprising at least one of a paint color name, a paint color formula, and a color measurement.

12. The kit of claim 8, further comprising a color analyzer configured to provide the at least one user-preferred paint color identifier.

13. The kit of claim 9, wherein the display means is non-electronic.

14. The kit of claim 8, wherein the pre-reduced paint product is thinned from between 2% and 10%.

15. A system for creating at least one exemplary end-use paint color, comprising:
 at least one processor;
 a network module coupled to the at least one processor to enable communication over a network;
 a color formula database configured to store a plurality of paint color identifiers, wherein each of the plurality of paint color identifiers is associated with at least one base color identifier;
 a conversion module connected, via the network module, to the color formula database;
 a paint analysis module connected, via the network module, to the color formula database;
 a memory device operatively coupled to the at least one processor, the conversion module, and the color formula module, wherein the memory device is configured to store computer readable instructions that, when executed by the at least one processor, cause the system to:
 provide, via the network module, a first user input from a user received on a user interface displayed by the user device to the paint analysis module;
 generate, by the paint analysis module, one or more colorant identifiers in response to the first user input, wherein each of the one or more colorant identifiers are associated with a colorant;
 provide, by the network module, a second user input from the user received on the user interface displayed by the user device to the conversion module;
 generate, by the conversion module, a quantity of each of the one or more colorants, wherein the quantity of each of the at least one or more colorants is associated with the second user input; and
 send, by the network module, the quantity of each of the one or more colorants to the user interface of the user device;
 wherein each of the one or more colorants are provided to the user in a kit, wherein the kit enables the user to form the at least one exemplary end-use paint color based on the first user input and the second user input via a mixing means of the kit configured to physically combine the one or more colorants.

16. The system of claim 15, wherein the first user input comprises at least one user-preferred paint color identifier and the second user input comprises a user-preferred paint quantity.

17. The system of claim 15, wherein the user-preferred paint color identifier comprises at least one of a paint color name, a paint color formula, and a color measurement.

18. The system of claim 15, wherein the user-preferred paint quantity comprises a quantity of paint from 0.25 ounces to 20 ounces.

19. The system of claim 15, wherein the forming further includes:
 forming, by the user, at least one user-preferred paint color based on the first user input and the second user input, wherein each of the at least one user-preferred paint color is formed via the mixing means of the kit combining a pre-reduced paint product and the at least one colorant;

applying, by the user, the at least one user-preferred paint color to a display means of the kit, wherein the display means is configured to display the at least one user preferred paint color in an end-use state; and confirming, by the user, the at least one user-preferred paint color in the end-use state as the at least one exemplary end-use paint color.

20. The system of claim 19, wherein the display means is non-electronic.

* * * * *